United States Patent
Yamaji

(10) Patent No.: US 12,429,374 B2
(45) Date of Patent: Sep. 30, 2025

(54) CHARACTERISTIC VALUE CORRECTION DEVICE, CHARACTERISTIC VALUE CALCULATION DEVICE, INSPECTION DEVICE INCLUDING THE SAME, CHARACTERISTIC VALUE CORRECTION METHOD, LIGHT-EMITTING DEVICE, AND CHARACTERISTIC VALUE CORRECTION PROGRAM

(71) Applicant: NICHIA CORPORATION, Anan (JP)

(72) Inventor: Yoshiki Yamaji, Anan (JP)

(73) Assignee: NICHIA CORPORATION, Anan (JP)

(*) Notice: Subject to any disclaimer, the term of this patent is extended or adjusted under 35 U.S.C. 154(b) by 140 days.

(21) Appl. No.: 18/536,168

(22) Filed: Dec. 11, 2023

(65) Prior Publication Data
US 2024/0201012 A1    Jun. 20, 2024

(30) Foreign Application Priority Data
Dec. 16, 2022   (JP) .................. 2022-201575

(51) Int. Cl.
*H05B 45/14*   (2020.01)
*G01J 1/20*   (2006.01)
*G01J 1/42*   (2006.01)

(52) U.S. Cl.
CPC .............. *G01J 1/4257* (2013.01); *G01J 1/20* (2013.01); *H05B 45/14* (2020.01)

(58) Field of Classification Search
CPC ............ G01J 1/4257; G01J 1/20; H05B 45/14
See application file for complete search history.

(56) References Cited

U.S. PATENT DOCUMENTS

| | | |
|---|---|---|
| 2005/0263680 A1 | 12/2005 | Stein et al. |
| 2007/0295912 A1 | 12/2007 | Jurgen et al. |
| 2008/0111079 A1 | 5/2008 | Stein et al. |

FOREIGN PATENT DOCUMENTS

| | | | |
|---|---|---|---|
| CN | 103957649 A | * | 7/2014 |
| JP | 2007-207999 A | | 8/2007 |
| JP | 2007-537583 A | | 12/2007 |

* cited by examiner

*Primary Examiner* — Henry Luong
(74) *Attorney, Agent, or Firm* — Global IP Counselors, LLP

(57) ABSTRACT

A characteristic value correction device includes a waveform acquiring unit, an area calculating unit, a time calculating unit, and a correction coefficient calculating unit. The waveform acquiring unit is configured to acquire a waveform indicating a relationship between an elapsed time and a first current value obtained when the pulse current is applied to a light-emitting device. The area calculating unit is configured to calculate a first area of an entire waveform and a second area of a rectangular wave portion. The time calculating unit is configured to calculate a first time between an application start time and an application end time of the pulse current and a second time corresponding to the second area. The correction coefficient calculating unit is configured to obtain a correction coefficient based on a ratio between the first area and the second area and a ratio between the first time and the second time.

10 Claims, 7 Drawing Sheets

FIG. 5

| ITEM | | | CONDITION | STANDARD | MAXIMUM | UNIT |
|---|---|---|---|---|---|---|
| FORWARD VOLTAGE | $V_F$ | | $I_F$=650mA | 3.25 | — | V |
| LUMINOUS FLUX | $\Phi_V$ | | $I_F$=650mA | 260 | — | Lm |
| CHROMATICITY COORDINATES | | x | $I_F$=650mA | 0.322 | — | — |
| | | y | $I_F$=650mA | 0.335 | | |

CHARACTERISTIC VALUE CORRECTION DEVICE, CHARACTERISTIC VALUE CALCULATION DEVICE, INSPECTION DEVICE INCLUDING THE SAME, CHARACTERISTIC VALUE CORRECTION METHOD, LIGHT-EMITTING DEVICE, AND CHARACTERISTIC VALUE CORRECTION PROGRAM

CROSS-REFERENCE TO RELATED APPLICATIONS

The present application claims priority under 35 U.S.C. § 119 to Japanese Patent Application No. 2022-201575, filed Dec. 16, 2022, the content of which is hereby incorporated herein by reference in its entirety.

BACKGROUND

1. Technical Field

The present disclosure relates to a characteristic value correction device, a characteristic value calculation device, and an inspection device including the same, a characteristic value correction method, a light-emitting device, and a characteristic value correction program.

2. Description of Related Art

In recent years, for a light-emitting device, such as a Light-Emitting Diode (LED), an inspection device that applies a predetermined current to measure an amount of light and inspects whether the amount of light is in a normal range has been used. For example, Japanese Patent Application Publication No. 2007-537583 discloses a method for correcting a temperature dependency of a photodetector using a predetermined parameter related to a temperature of an LED in a predetermined relationship and correcting a measured amount of emitted light with a correction factor, which is determined using a calibration table, for temperature contingent fluctuations in the amount of emitted light.

Japanese Patent Application Publication No. 2007-207999 discloses a method for detecting stability of a Laser Diode (LD) element by measuring input/output characteristics and differential characteristics thereof using two light-receiving elements having different responsiveness, and calibrating input/output characteristics of a semiconductor laser element in short-pulse driving measured by a second light-receiving element based on the coupling efficiency of the second light-receiving element calculated from the measurement results.

SUMMARY

In the methods disclosed in the publications, usually, a pulse current is applied in as short of a time as possible to suppress an amount of heat generation of the LED, and the characteristics (such as luminous flux) of the LED are inspected. However, since the pulse current tends to deviate from a rectangular wave as the pulse width shortens, there is a possibility that a current value originally intended to be applied cannot be applied.

Embodiments of the present disclosure can provide a characteristic value correction device, a characteristic value calculation device, an inspection device including the same, a characteristic value correction method, a light-emitting device, and a characteristic value correction program that allow obtaining a result of characteristic inspection when a current value originally intended to be applied is applied to apply a pulse current and inspect characteristics of the light-emitting device.

A characteristic value correction device according to the present disclosure is a device for correcting a characteristic value of a light-emitting device using a first current value actually flowing through the light-emitting device when a pulse current is applied to the light-emitting device to inspect a characteristic of the light-emitting device in an inspection device that inspects the characteristic of the light-emitting device. The characteristic value correction device includes a waveform acquiring unit, an area calculating unit, a time calculating unit, and a correction coefficient calculating unit. The waveform acquiring unit is configured to acquire a waveform indicating a relationship between an elapsed time and the first current value obtained when the pulse current is applied to the light-emitting device. The area calculating unit is configured to calculate a first area of an entire waveform acquired in the waveform acquiring unit and a second area of a rectangular wave portion where the first current value is stable in the waveform. The time calculating unit is configured to calculate a first time between an application start time and an application end time of the pulse current of the entire waveform and a second time corresponding to the second area. The correction coefficient calculating unit is configured to obtain a correction coefficient based on a ratio between the first area and the second area calculated in the area calculating unit and a ratio between the first time and the second time calculated in the time calculating unit.

A characteristic value calculation device according to the present disclosure is a characteristic value calculation device for calculating a characteristic value of a light-emitting device using a first current value actually flowing through the light-emitting device when a pulse current is applied to the light-emitting device to inspect a characteristic of the light-emitting device in an inspection device that inspects the characteristic of the light-emitting device. The characteristic value calculation device includes a waveform acquiring unit, a graph replacement processing unit, and a characteristic value calculating unit. The waveform acquiring unit is configured to acquire a waveform indicating a relationship between an elapsed time and the first current value obtained when the pulse current is applied to the light-emitting device. The graph replacement processing unit is configured to replace the waveform acquired in the waveform acquiring unit with a graph of a rectangular wave indicating a relationship between an elapsed time and the characteristic value based on a relationship between a current value flowing through the light-emitting device and the characteristic value. The characteristic value calculating unit is configured to integrate the graph of the rectangular wave to calculate the characteristic value of the light-emitting device.

An inspection device according to the present disclosure includes the characteristic value correction device, a measurement device configured to measure a first measurement value of the characteristic of the light-emitting device, and a characteristic converting unit configured to calculate a second measurement value by multiplying the first measurement value obtained by the measurement device by the correction coefficient obtained by the characteristic value correction device.

A characteristic value correction method according to the present disclosure is a characteristic value correction method for correcting a characteristic value of a light-emitting device using a first current value actually flowing through the light-emitting device when a pulse current is applied to the light-emitting device to inspect a characteristic of the light-emitting device in an inspection device that inspects the characteristic of the light-emitting device. The characteristic value correction method includes: acquiring a waveform indicating a relationship between an elapsed time and the first current value obtained when the pulse current is applied to the light-emitting device; calculating a first area of an entire waveform acquired in the acquiring of the waveform and a second area of a rectangular wave portion where the first current value is stable in the waveform; calculating a first time between an application start time and an application end time of the pulse current of the entire waveform and a second time corresponding to the second area; and obtaining a correction coefficient based on a ratio between the first area and the second area and a ratio between the first time and the second time.

A non-transitory computer-readable medium having stored thereon a characteristic value correction program according to the present disclosure is a characteristic value correction program for correcting a characteristic value of a light-emitting device using a first current value actually flowing through the light-emitting device when a pulse current is applied to the light-emitting device to inspect a characteristic of the light-emitting device in an inspection device that inspects the characteristic of the light-emitting device. The characteristic value correction program causes a computer to execute a characteristic value correction method that includes: acquiring a waveform indicating a relationship between an elapsed time and the first current value obtained when the pulse current is applied to the light-emitting device; calculating a first area of the entire waveform acquired in the acquiring of the waveform and a second area of a rectangular wave portion where the first current value is stable in the waveform; calculating a first time between an application start time and an application end time of the pulse current of the entire waveform and a second time corresponding to the second area; and obtaining a correction coefficient based on a ratio between the first area and the second area and a ratio between the first time and the second time.

The characteristic value correction device according to the present disclosure allows obtaining a result of characteristic inspection when a current value originally intended to be applied is applied to apply a pulse current and inspect the characteristics of the light-emitting device.

BRIEF DESCRIPTION OF THE DRAWINGS

A more complete appreciation of embodiments of the invention and many of the attendant advantages thereof will be readily obtained by reference to the following detailed description when considered in connection with the accompanying drawings.

FIG. 5 is a diagram showing characteristics (luminous flux and the like) of the LED corrected by the PC of FIG. 2.

DETAILED DESCRIPTION

Description of Embodiments

A Personal Computer (PC) (an example of a characteristic value correction device) 10 and an inspection system (inspection device) 20 including the PC 10 according to an embodiment of the present disclosure will be described below with reference to FIGS. 1 to 6.

Note that, in the following description, a size, positional relationship, or the like of members illustrated in the respective drawings may be exaggerated for clarity of description. Further, in the following description, in principle, members having the same terms and reference signs represent the same members or members of the same quality, and the detailed description thereof will be omitted as appropriate. In the following description, terms indicating specific directions and positions (for example, "upper", "lower", "right", "left", and other terms including these terms) are used as necessary. However, the use of these terms is to facilitate the understanding of the disclosure with reference to the drawings, and the technical scope of the present disclosure is not limited by the meaning of these terms. Further, in the present disclosure, "parallel" and "perpendicular" or "orthogonal" include, unless otherwise stated, a case in which each of two straight lines, sides, surfaces, or the like are in a range of about +5° from 0° and about +5° from 90°

(1) Configuration of Inspection System 20

Figure 1:
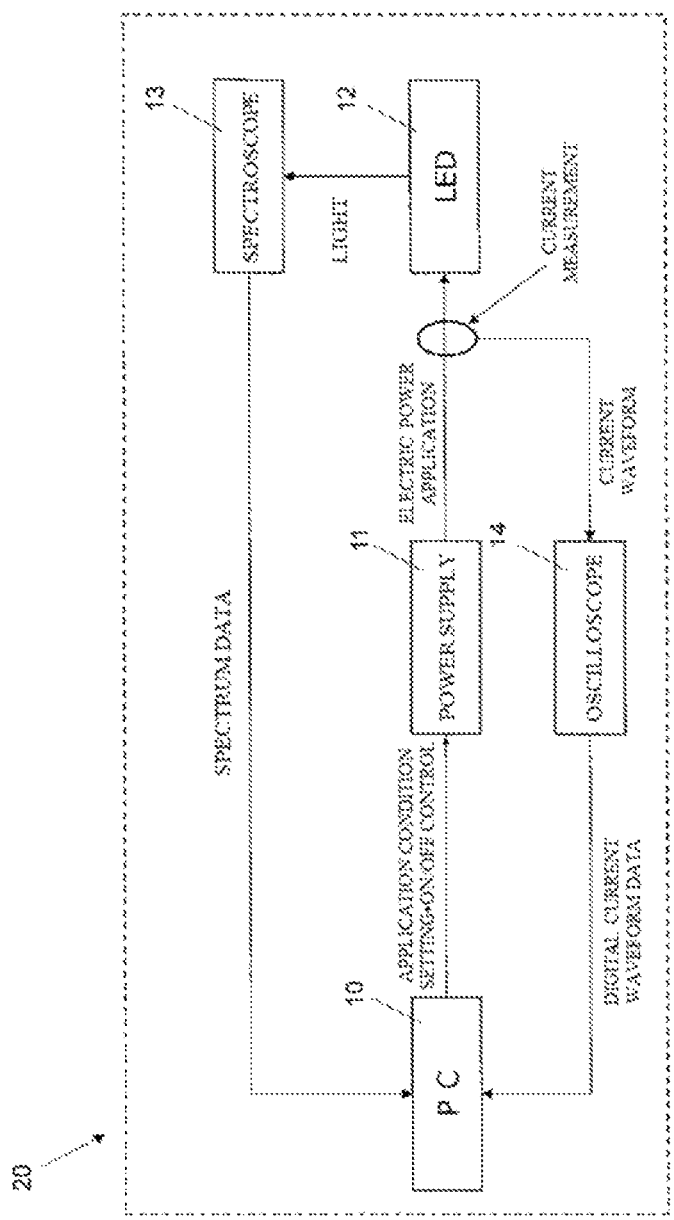
FIG. 1 is a block diagram illustrating a configuration of an inspection system including a PC according to an embodiment of the present disclosure.

The inspection system (inspection device) 20 of the present embodiment is a system that inspects characteristics (for example, luminous flux and/or brightness) of a light-emitting device (Light-Emitting Diode (LED 12)) to be inspected. As illustrated in FIG. 1, the inspection system 20 includes the PC (an example of a characteristic value correction device) 10, a power supply 11, the LED 12, a spectroscope (an example of measurement device) 13, and an oscilloscope 14.

When a pulse current (see FIG. 3) is applied to the LED 12 in the spectroscope 13 that inspects the characteristics of the LED 12 to inspect the characteristics of the LED 12, the PC (characteristic value correction device) 10 corrects the characteristic value of the LED 12 using a first current value that has actually flowed through the LED 12. To be specific, the PC 10 uses a predetermined correction coefficient to correct the first current value that has actually flowed through the LED 12 to a characteristic value that could have been obtained when a second current value as a current value to be originally applied to the LED 12 flows.

Here, when the characteristics, such as luminous flux, of the light-emitting device are inspected by applying a pulse current, since the pulse current tends to deviate from a rectangular wave as the pulse width shortens, there is a possibility that a current value originally intended to be applied cannot be applied. Therefore, the predetermined second current value (the current value originally intended to be applied) is different from the first current value that has actually flowed through the LED 12.

The detailed configuration of the PC 10 will be described below in detail.

Figure 3:
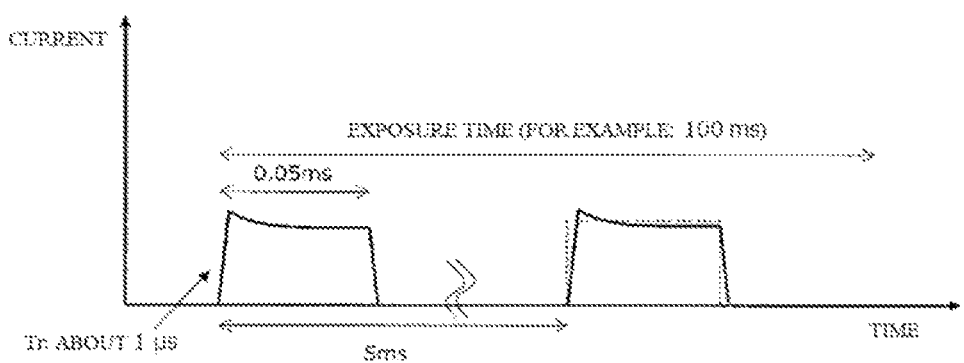
FIG. 3 is a graph showing a waveform of a pulse current applied to an LED to be inspected in the inspection system of FIG. 1.

The power supply 11 is a power supply device that applies electric power to the LED 12 and is controlled by the PC 10. In the power supply 11, application conditions of the electric power applied to the LED 12 are set and ON/OFF control of the LED 12 is controlled by the PC 10. As illustrated in FIG. 3, when the exposure time is, for example, 100 ms, the power supply 11 applies a pulse current having a pulse width of 0.05 ms to the LED 12 at 5 ms intervals.

The LED (light-emitting device) 12 is one of the light-emitting devices to be inspected in the inspection system 20. In the present embodiment, as the characteristics of the LED 12, whether an appropriate luminous flux (lm) is obtained at a predetermined current value is inspected. To be specific, the LED 12 irradiates light by the electric power applied from the power supply 11, and the luminous flux is measured by the spectroscope 13.

The spectroscope (an example of a measurement device) 13 measures a luminous flux, which is one of the characteristics of the LED 12. To be specific, the spectroscope 13 measures the light irradiated from the LED 12 by the electric power applied from the power supply 11 and transmits the measurement result to the PC 10 as spectrum data.

Thus, the PC 10 calculates the relative brightness of the LED 12 using the spectrum data received from the spectroscope 13.

The oscilloscope 14 measures a current waveform (pulse current) of the electric power applied to the LED 12 from the power supply 11 controlled by the PC 10 and transmits the measured current waveform to the PC 10 as digital current waveform data.

Thus, the PC 10 calculates a correction coefficient K, which will be described below, using the digital waveform data received from the oscilloscope 14.

(2) Configuration of PC 10

Figure 2:
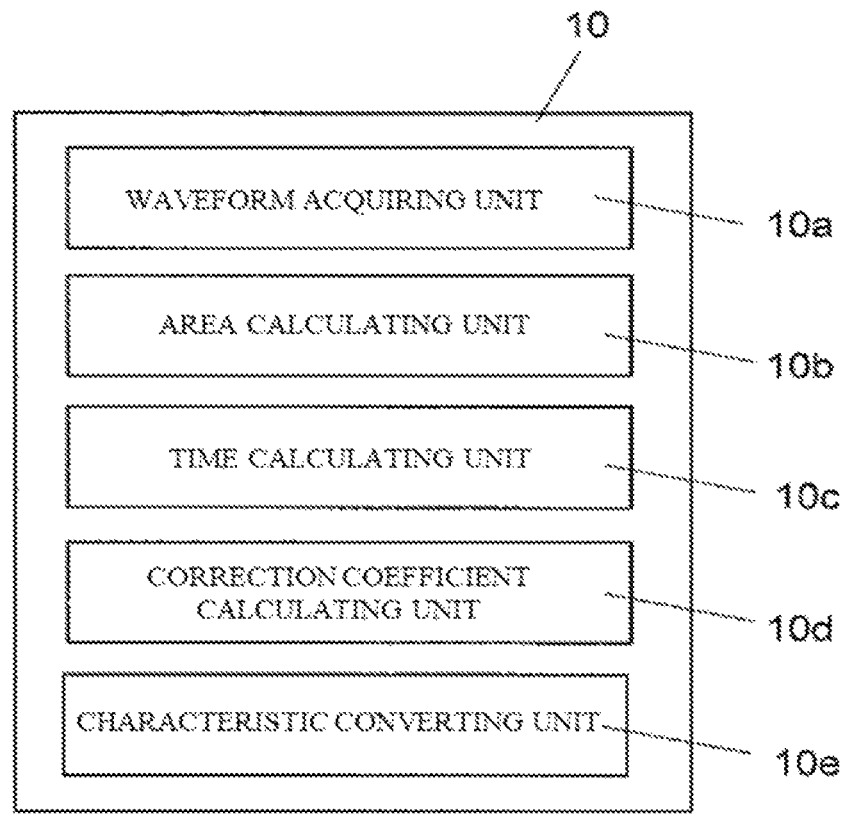
FIG. 2 is a block diagram illustrating a functional block formed in the PC included in the inspection system of FIG. 1.

The PC 10 according to the present embodiment calculates two areas (a first area S1 and a second area S2) from the waveform of the pulse current applied to the LED 12, and calculates a measurement value (e.g., brightness) in a case in which it is assumed that the pulse current having the current value originally intended to be applied is applied using the ratio of the two areas. As illustrated in FIG. 2, the PC 10 includes a waveform acquiring unit 10a, an area calculating unit 10b, a time calculating unit 10c, a correction coefficient calculating unit 10d, and a characteristic converting unit 10e.

Note that the waveform acquiring unit 10a, the area calculating unit 10b, the time calculating unit 10c, the correction coefficient calculating unit 10d, and the characteristic converting unit 10e illustrated in FIG. 2 are a functional block generated in the PC 10 by reading various programs stored in a memory in the PC 10 by a CPU in the PC 10.

The waveform acquiring unit 10a acquires a waveform indicating a relationship between the elapsed time obtained when the pulse current illustrated in FIG. 3 is applied to the LED 12 and the first current value flowing through the LED 12.

Figure 4A:
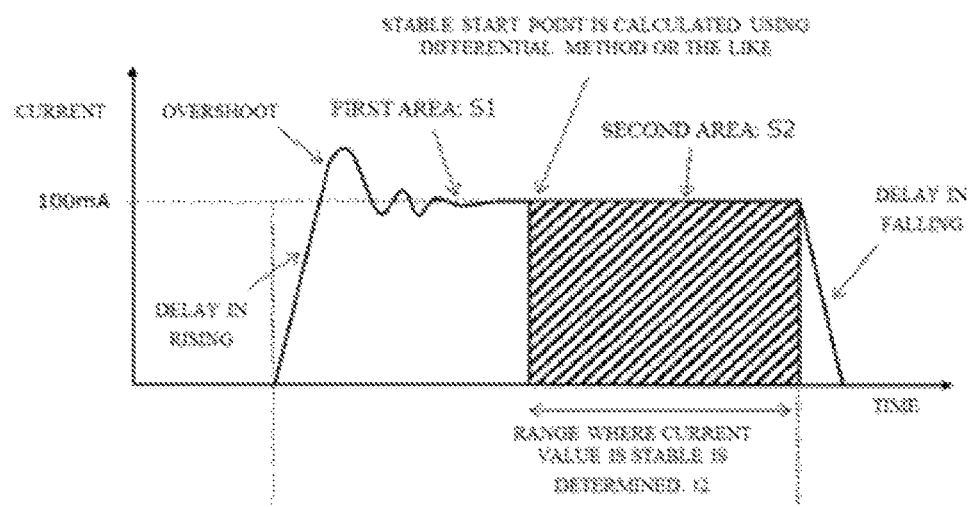
FIG. 4A is an enlarged view of the waveform of the pulse current in FIG. 3.
Figure 4B:
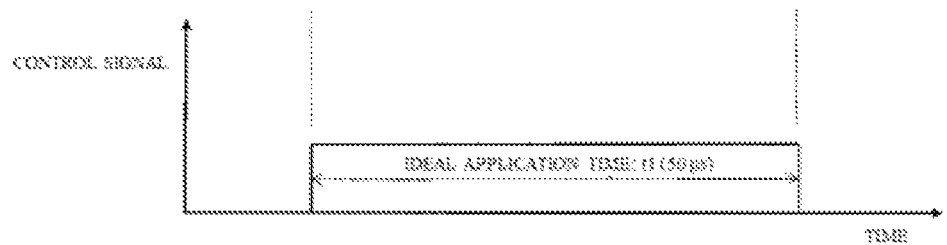
FIG. 4B is a graph showing an application time of the pulse current corresponding to FIG. 4A.

Here, as illustrated in FIG. 4A, when one waveform is enlarged, the waveform acquired by the waveform acquiring unit 10a does not in some cases actually form an exact rectangular wave due to, for example, delay in rising (rise time Tr), overshooting, and delay in falling during the ideal application time shown in FIG. 4B (first time $t_1$) (for example, 50 μs). In particular, as the pulse width of the pulse current becomes short, the pulse current is likely to deviate from the rectangular wave. Therefore, there is a possibility that a current value originally intended to be applied cannot be applied.

For this reason, the PC 10 of the present embodiment acquires the waveform of the pulse current actually flowing through the LED 12 and corrects the characteristic value of the LED 12 using the correction coefficient described below, thereby calculating the characteristic value corresponding to the current value originally intended to be applied to the LED 12.

The area calculating unit 10b calculates the first area S1 of the entire waveform acquired by the waveform acquiring unit 10a and the second area S2 (the hatched portion in the drawing) of a rectangular wave portion where the first current value (100 mA in FIG. 4A) is stable in the waveform.

Here, the area calculating unit 10b sets, as a start point (stable start point) of the rectangular wave corresponding to the second area S2, a point in time at which an amount of change per unit time becomes almost 0 (substantially 0). The stable start point can be calculated using, for example, a differential method.

In addition, the area calculating unit 10b sets the end point of the rectangular wave corresponding to the second area S2 in accordance with the application end time of the pulse current shown in FIG. 4B.

The time calculating unit 10c calculates a first time $t_1$ between the application start time and the application end time of the pulse current of the entire waveform and a second time $t_2$ corresponding to the second area.

The correction coefficient calculating unit 10d obtains the correction coefficient K including (based on) the ratio between the first area S1 and the second area S2 calculated by the area calculating unit 10b and the ratio between the first time $t_1$ and the second time $t_2$ calculated by the time calculating unit 10c.

The correction coefficient K is expressed by the following relational equation (1), using the first area S1, the second area S2, the first time $t_1$, and the second time $t_2$:

$$\text{Correction coefficient } K = (S2/S1) \times (t_1/t_2) \quad (1)$$

The characteristic converting unit 10e calculates a second measurement value by multiplying a luminous flux (lm) (a first measurement value) of the LED 12 measured by the spectroscope 13 by the correction coefficient K obtained in the PC 10.

As a result, when a pulse current is applied to the LED 12 to inspect whether the luminous flux of the LED 12 has a value in a desired range corresponding to the applied current value, the PC 10 can correct the characteristics (luminous flux (lm) and the like) of the LED 12 using the correction coefficient for correcting the current value actually flowing through the LED 12 to the current value originally intended to be applied.

Therefore, when the characteristics of the LED 12 are inspected by applying the pulse current, the result of the characteristic inspection in a case in which the pulse current is applied at a current value originally intended to be applied can be obtained.

Here, as shown in FIG. 5, in the present embodiment, the characteristic of the LED 12 corrected using the correction coefficient is a luminous flux $\Phi_V$ of the LED 12. However, the characteristic of the LED 12 to be corrected is not limited to the luminous flux $\Phi_V$, and may be another item (brightness, chromaticity coordinates, or the like).

The respective characteristic values of the forward voltage, the luminous flux, and the chromaticity coordinates shown in FIG. 5 are measured under the condition of a temperature Tj=25° C. in a continuous rectangular wave of an applied pulse current having a pulse width of 0.05 ms and a duty ratio of 1%. In addition, the luminous flux (lm) conforms to a national standard calibration value compliant with Commission internationale de l'eclairage (International Commission on Illumination) (CIE) 127:2007. Furthermore, the chromaticity coordinates are based on the CIE1931 chromaticity diagram.

Current Value Correction Method

Figure 6:
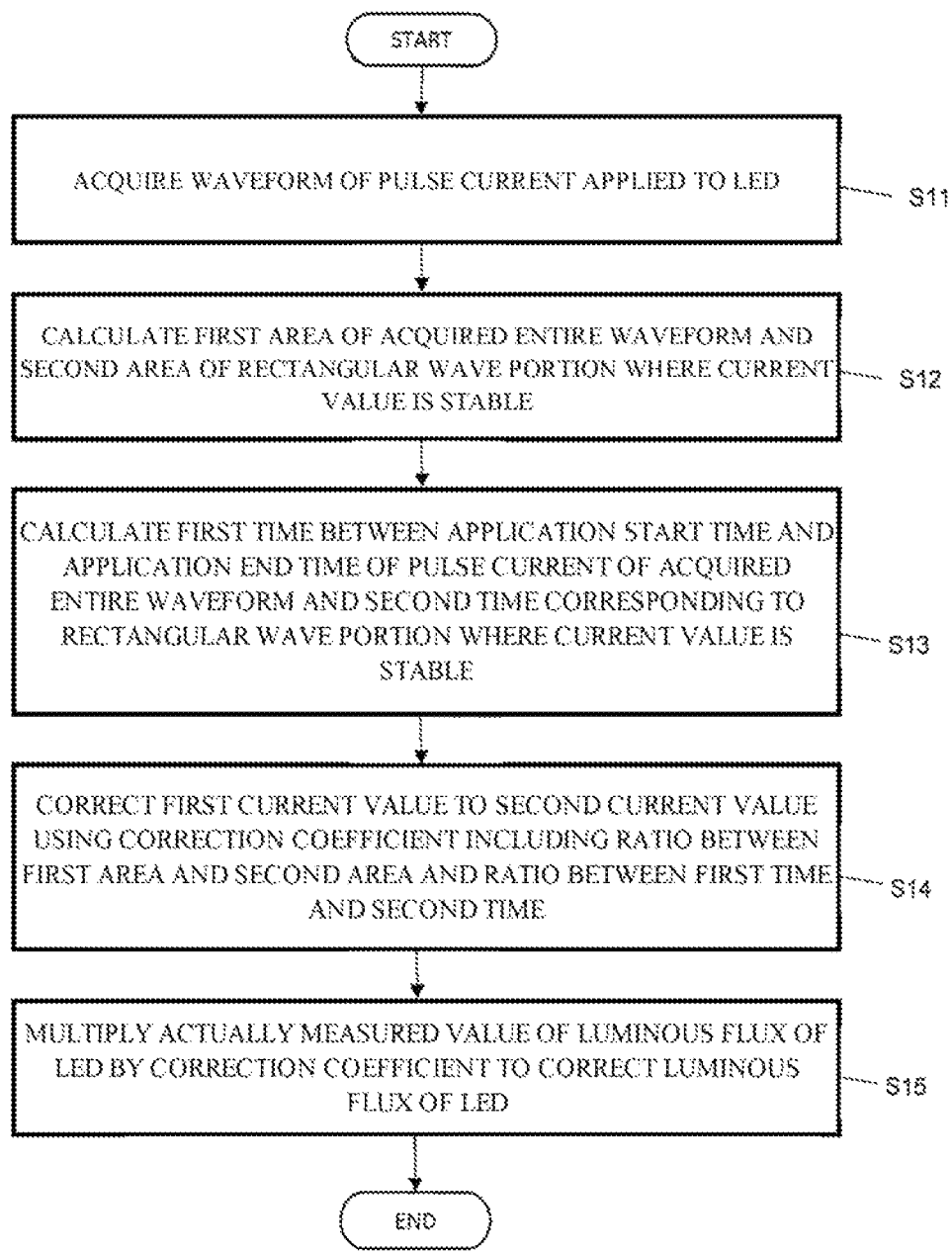
FIG. 6 is a flowchart depicting a flow of a process of a characteristic value correction method performed in the PC of the inspection system of FIG. 1.

In the present embodiment, in the above-described inspection system 20, the PC 10 performs the current value correction method (characteristic value correction method) according to the flowchart depicted in FIG. 6.

That is, in step S11, the waveform acquiring unit 10a of the PC 10 acquires the waveform indicating the relationship between the elapsed time and the first current value obtained when the pulse current is applied to the LED 12 illustrated in FIG. 3 (waveform acquiring step).

Subsequently, in step S12, the area calculating unit 10b of the PC 10 calculates the first area S1 of the entire waveform acquired in the waveform acquiring step and the second area S2 of the rectangular wave portion where the first current value is stable in the waveform illustrated in FIG. 4A (area calculating step).

Subsequently, in step S13, the time calculating unit 10c of the PC 10 calculates the first time $t_1$ between the application start time and the application end time of the pulse current of the entire waveform and the second time $t_2$ corresponding to the second area illustrated in FIGS. 4A and 4B (time calculating step).

Subsequently, in step S14, the correction coefficient calculating unit 10d of the PC 10 obtains the correction coefficient K including (based on) the ratio between the first area and the second area calculated in the area calculating step and the ratio between the first time and the second time calculated in the time calculating step (correction coefficient calculating step).

Subsequently, in step S15, the characteristic converting unit 10e of the PC 10 multiplies the value of the luminous flux (lm) measured using the spectroscope 13 by the correction coefficient K obtained in step S14 to calculate the luminous flux (lm) of the LED 12 corresponding to the current value after correction.

Features

The PC (characteristic value correction device) 10 of the present embodiment corrects the characteristic value of the LED 12 using the first current value actually flowing through the LED 12 when the pulse current is applied to the LED 12 to inspect the characteristics of the LED 12 in the inspection system 20 that inspects the characteristics of the LED 12. The PC 10 includes the waveform acquiring unit 10a, the area calculating unit 10b, the time calculating unit 10c, and the correction coefficient calculating unit 10d. The waveform acquiring unit 10a acquires the waveform indicating the relationship between the elapsed time and the first current value obtained when the pulse current is applied to the LED 12. The area calculating unit 10b calculates the first area of the entire waveform acquired in the waveform acquiring unit 10a and the second area of the rectangular wave portion where the first current value is stable in the waveform. The time calculating unit 10c calculates the first time $t_1$ between the application start time and the application end time of the pulse current of the entire waveform and the second time $t_2$ corresponding to the second area. The correction coefficient calculating unit 10d obtains the correction coefficient including (based on) the ratio between the first area and the second area calculated in the area calculating unit 10b and the ratio between the first time and the second time calculated in the time calculating unit 10c.

As a result, when a predetermined pulse current is applied to the LED 12 to inspect whether the characteristic value (such as the luminous flux) of the LED 12 is a value in a desired range corresponding to the applied current value, the PC 10 can correct the characteristic (luminous flux (l m) and the like) of the LED 12 using the correction coefficient for correcting the current value actually flowing through the LED 12 to the current value originally intended to be applied.

Therefore, when the characteristics (such as the luminous flux) of the LED 12 are inspected by applying the pulse current, the result of the characteristic inspection in a case in which the pulse current is applied at a current value originally intended to be applied can be obtained.

OTHER EMBODIMENTS

Although one embodiment of the present disclosure has been described above, the present disclosure is not limited to the embodiment, and various changes can be made without departing from the gist of the present disclosure.

(A)

In the embodiment, as the PC (an example of a characteristic value correction device) 10 and the characteristic value correction method, an example in which the present disclosure is achieved has been described. However, the present disclosure is not limited to this.

For example, the present disclosure may be achieved as a characteristic value correction program that causes a computer to execute the above-described characteristic value correction method.

The characteristic value correction program is stored in the non-transitory computer-readable medium or memory (storage unit) mounted on the characteristic value correction device, and the CPU reads the characteristic value correction program stored in the memory and causes the hardware to execute each step. More specifically, the CPU reads the characteristic value correction program and executes the waveform acquiring step, the area calculating step, the time calculating step, and the correction coefficient calculating step described above, and thus the same effect as described above can be obtained.

Further, the present disclosure may be achieved as a non-transitory computer-readable recording medium storing the characteristic value correction program.

(B)

In the embodiment, an example in which the actually measured current value or the luminous flux of the LED 12 is corrected using the correction coefficient K so as to be the current value or the luminous flux originally intended to be applied to the LED 12 has been described. However, the present disclosure is not limited to this.

Figure 7A:
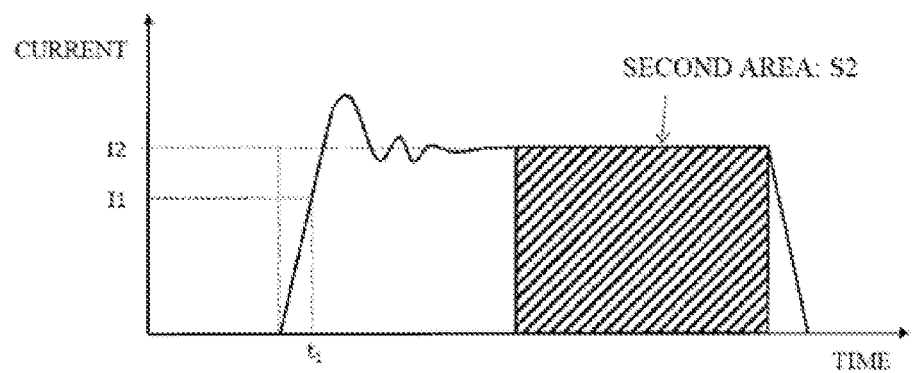
FIG. 7A is a graph showing a relationship between an elapsed time and a current value flowing through the LED used in a characteristic value correction method according to another embodiment of the present disclosure.
Figure 7B:
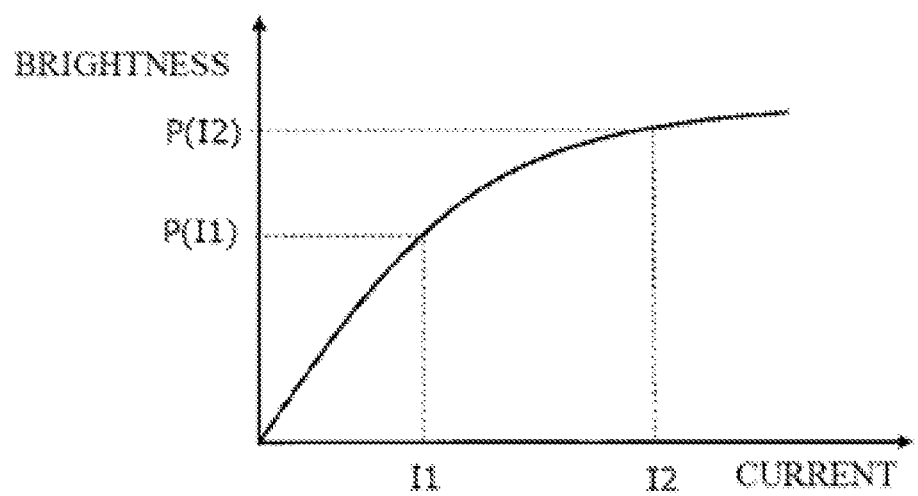
FIG. 7B is a graph showing a relationship between the current flowing through the LED and brightness of light irradiated from the LED.
Figure 7C:
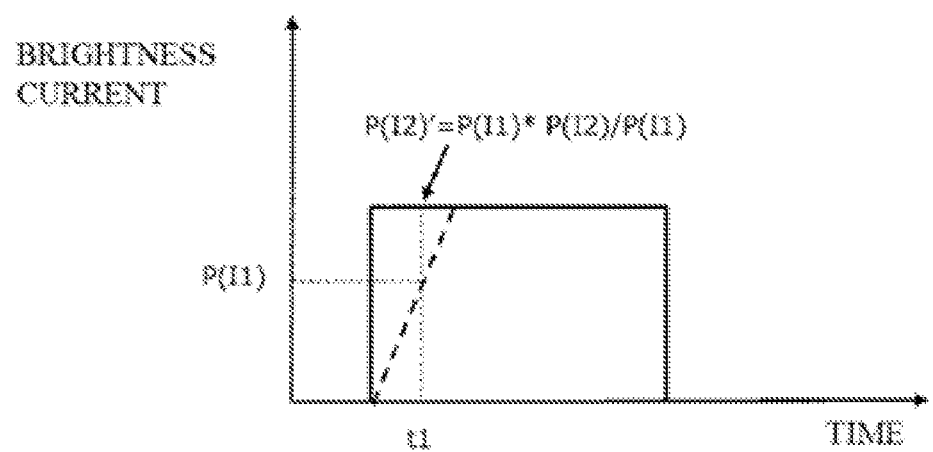
FIG. 7C is a graph showing a relationship between the elapsed time and the current flowing through the LED and the brightness.

For example, using the graphs illustrated in FIGS. 7A to 7C, correction may be performed so as to obtain a current value or a luminous flux originally intended to be applied.

FIGS. 7A to 7C show I representing a current value and P representing brightness.

Specifically, since the current value at each point (time) is found from the waveform in the graph showing the relationship between the elapsed time and the current value (first current value) flowing through the LED illustrated in FIG. 7A, a graph replacement processing unit of the characteristic value correction device can use the graph of FIG. 7B illustrating the relationship between the current value and the brightness of the LED to replace the graph of FIG. 7A with the graph of the rectangular wave illustrated in FIG. 7C showing the relationship between the time and the brightness.

Then, a characteristic value calculating unit of the characteristic value correction device integrates the graph of the rectangular wave illustrated in FIG. 7C (P(I2)'=P(I1)*P(I2)/P(I1)), and thus the brightness of the LED corresponding to the current value originally intended to be applied to the LED can be calculated.

According to this method, although the relationship between the current and the brightness can be regarded as a straight line with a minute current variation, there is a possibility that the relationship cannot be regarded as a straight line when the current variation is large. Therefore, this method can be used as an effective correction method in that case.

(C)

In the embodiment, an example in which the LED 12 is used as the light-emitting device to be inspected has been described. However, the present disclosure is not limited to this.

For example, the characteristic value correction device may be a characteristic value correction device included in an inspection device that inspects another light-emitting device, such as a Laser Diode (LD).

(D)

In the embodiment, an example in which the characteristic value correction device of the present disclosure is mounted in the PC 10 has been described. However, the present disclosure is not limited to this.

For example, the characteristic value correction device of the embodiment may be provided as a dedicated device for the characteristic value correction device separately from a calculation device, such as a PC.

The characteristic value correction device of the present disclosure has an effect of allowing obtaining the result of characteristic inspection when the pulse current is applied at the current value originally intended to be applied when the characteristics of the light-emitting device are inspected by applying a pulse current. Therefore, the characteristic value correction device is widely applicable to devices for inspecting characteristics of various light-emitting devices.

What is claimed is:

1. A characteristic value correction device for correcting a characteristic value of a light-emitting device using a first current value actually flowing through the light-emitting device when a pulse current is applied to the light-emitting device to inspect a characteristic of the light-emitting device in an inspection device that inspects the characteristic of the light-emitting device, the characteristic value correction device comprising:
a waveform acquiring unit configured to acquire a waveform indicating a relationship between an elapsed time and the first current value obtained when the pulse current is applied to the light-emitting device;
an area calculating unit configured to calculate a first area of an entire waveform acquired in the waveform acquiring unit and a second area of a rectangular wave portion where the first current value is stable in the waveform;
a time calculating unit configured to calculate a first time between an application start time and an application end time of the pulse current of the entire waveform and a second time corresponding to the second area; and
a correction coefficient calculating unit configured to obtain a correction coefficient based on a ratio between the first area and the second area calculated in the area calculating unit and a ratio between the first time and the second time calculated in the time calculating unit.

2. The characteristic value correction device according to claim 1, wherein
the area calculating unit is configured to set a point in time at which an amount of change per unit time becomes substantially 0 as a start point of the rectangular wave portion corresponding to the second area.

3. The characteristic value correction device according to claim 1, wherein
the area calculating unit is configured to set an end point of the rectangular wave portion corresponding to the second area in accordance with the application end time of the pulse current.

4. The characteristic value correction device according to claim 1, wherein
the correction coefficient K is represented by the following relational expression (1):

$$\text{Correction coefficient } K = (\text{second area}/\text{first area}) \times (\text{first time}/\text{second time}) \quad (1).$$

5. A characteristic value calculation device for calculating a characteristic value of a light-emitting device using a first current value actually flowing through the light-emitting device when a pulse current is applied to the light-emitting device to inspect a characteristic of the light-emitting device in an inspection device that inspects the characteristic of the light-emitting device, the characteristic value calculation device comprising:
a waveform acquiring unit configured to acquire a waveform indicating a relationship between an elapsed time and the first current value obtained when the pulse current is applied to the light-emitting device;
a graph replacement processing unit configured to replace the waveform acquired in the waveform acquiring unit with a graph of a rectangular wave indicating a relationship between an elapsed time and the characteristic value based on a relationship between a current value flowing through the light-emitting device and the characteristic value; and
a characteristic value calculating unit configured to integrate the graph of the rectangular wave to calculate the characteristic value of the light-emitting device.

6. The characteristic value calculation device according to claim 5, wherein
the characteristic value represents brightness of light emitted from the light-emitting device.

7. An inspection device comprising:
the characteristic value correction device according to claim 1;

a measurement device configured to measure a first measurement value of the characteristic of the light-emitting device; and a characteristic converting unit configured to calculate a second measurement value by multiplying the first measurement value obtained by the measurement device by the correction coefficient obtained by the characteristic value correction device.

8. A characteristic value correction method for correcting a characteristic value of a light-emitting device using a first current value actually flowing through the light-emitting device when a pulse current is applied to the light-emitting device to inspect a characteristic of the light-emitting device in an inspection device that inspects the characteristic of the light-emitting device, the characteristic value correction method comprising:

acquiring a waveform indicating a relationship between an elapsed time and the first current value obtained when the pulse current is applied to the light-emitting device;

calculating a first area of an entire waveform acquired in the acquiring of the waveform and a second area of a rectangular wave portion where the first current value is stable in the waveform;

calculating a first time between an application start time and an application end time of the pulse current of the entire waveform and a second time corresponding to the second area; and obtaining a correction coefficient based on a ratio between the first area and the second area and a ratio between the first time and the second time.

9. A light-emitting device inspected using a characteristic value corrected by the characteristic value correction method according to claim 8.

10. A non-transitory computer-readable medium having stored thereon a characteristic value correction program for correcting a characteristic value of a light-emitting device using a first current value actually flowing through the light-emitting device when a pulse current is applied to the light-emitting device to inspect a characteristic of the light-emitting device in an inspection device that inspects the characteristic of the light-emitting device, the characteristic value correction program causing a computer to execute a characteristic value correction method comprising:

acquiring a waveform indicating a relationship between an elapsed time and the first current value obtained when the pulse current is applied to the light-emitting device;

calculating a first area of the entire waveform acquired in the acquiring of the waveform and a second area of a rectangular wave portion where the first current value is stable in the waveform;

calculating a first time between an application start time and an application end time of the pulse current of the entire waveform and a second time corresponding to the second area; and obtaining a correction coefficient based on a ratio between the first area and the second area and a ratio between the first time and the second time.

* * * * *